(12) United States Patent
Pu et al.

(10) Patent No.: US 10,578,878 B2
(45) Date of Patent: Mar. 3, 2020

(54) COMMUNICATION DEVICE AND COMMUNICATION METHOD

(71) Applicant: HTC Corporation, Taoyuan (TW)

(72) Inventors: Ta-Chun Pu, Taoyuan (TW);
Chieh-Sen Lee, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 113 days.

(21) Appl. No.: 15/919,233

(22) Filed: Mar. 13, 2018

(65) Prior Publication Data

US 2018/0259778 A1 Sep. 13, 2018

Related U.S. Application Data

(60) Provisional application No. 62/470,365, filed on Mar. 13, 2017.

(51) Int. Cl.
*G02B 27/01* (2006.01)
*H04B 7/0408* (2017.01)
(Continued)

(52) U.S. Cl.
CPC ......... *G02B 27/0176* (2013.01); *H01Q 3/245* (2013.01); *H01Q 3/28* (2013.01);
(Continued)

(58) Field of Classification Search
CPC .... G02B 27/0176; G02B 27/01; H01Q 21/30; H01Q 21/061; H01Q 3/245; H01Q 3/28;
(Continued)

(56) References Cited

U.S. PATENT DOCUMENTS

2011/0237207 A1* 9/2011 Bauder ............... H01Q 1/521
455/78
2012/0032849 A1 2/2012 Hull, Jr. et al.
(Continued)

FOREIGN PATENT DOCUMENTS

TW 201624195 A 7/2016

OTHER PUBLICATIONS

Adam Conner-Simons | CSAIL, "Enabling wireless virtual reality", MIT News, URL: http://news.mit.edu/2016/enabling-wireless-virtual-reality-1114, Nov. 14, 2016.
(Continued)

*Primary Examiner* — Hai V Tran
(74) *Attorney, Agent, or Firm* — CKC & Partners Co., LLC (57) ABSTRACT

A communication device includes a base, a signal transceiver, a first antenna array and a second antenna array. The signal transceiver is configured to up-convert or down-convert the radio frequency signals. The first antenna array is disposed on the base and electrically coupled to the transceiver. The first antenna array is configured to receive or transmit a first radio frequency signal along a first orientation. The first radio frequency signal is transmitted between the first antenna array and the transceiver. The second antenna array is disposed on the base and electrically coupled to the first antenna array. The second antenna array is configured to receive or transmit a second radio frequency signal along a second orientation. The first radio frequency signal is transmitted between the second antenna array and the transceiver, via the first antenna array.

20 Claims, 9 Drawing Sheets

(51) Int. Cl.
- *H01Q 21/30* (2006.01)
- *H01Q 21/06* (2006.01)
- *H01Q 21/29* (2006.01)
- *H01Q 3/40* (2006.01)
- *H04B 7/08* (2006.01)
- *H01Q 3/28* (2006.01)
- *H01Q 3/24* (2006.01)
- *H04B 7/06* (2006.01)
- *H01Q 1/24* (2006.01)

(52) U.S. Cl.
CPC .............. *H01Q 3/40* (2013.01); *H01Q 21/061* (2013.01); *H01Q 21/29* (2013.01); *H01Q 21/30* (2013.01); *H04B 7/0408* (2013.01); *H04B 7/0617* (2013.01); *H04B 7/0842* (2013.01); *H04B 7/0871* (2013.01); *H01Q 1/246* (2013.01)

(58) Field of Classification Search
CPC ... H04B 7/0408; H04B 7/0617; H04B 7/0842

USPC ........................................................ 343/702
See application file for complete search history.

(56) References Cited

U.S. PATENT DOCUMENTS

| | | | |
|---|---|---|---|
| 2014/0078008 A1* | 3/2014 | Kang | H01Q 5/35 343/702 |
| 2016/0005233 A1* | 1/2016 | Fraccaroli | G02B 27/0172 345/633 |
| 2016/0047909 A1* | 2/2016 | Pu | G01S 7/032 342/27 |

OTHER PUBLICATIONS

Corresponding Taiwan office action dated Jan. 8, 2019.

\* cited by examiner

COMMUNICATION DEVICE AND COMMUNICATION METHOD

CROSS-REFERENCE TO RELATED APPLICATION

This application claims priority to U.S. Provisional Application Ser. No. 62/470,365, filed on Mar. 13, 2017, which is herein incorporated by reference.

BACKGROUND

Technical Field

Present disclosure relates to a communication device and a communication method. More particularly, the present disclosure relates to the communication device and the communication method for adapting signals from different orientation.

Description of Related Art

Virtual reality technology is very powerful in many approaches. Currently, signal transmissions between a host computer and a head-mounted display in most of the virtual reality systems are established through physical cables. If the signal transmissions were modified to be established through wireless communication, a phased-array antenna with beamforming adjustment can be helpful. However, line of sight of the phased-array antenna disposed on a head-mounted display is still vulnerable to the blind spots shaded by the user's head when the head-mounted display is moved or rotated. As a result, the communication may be disrupted.

Therefore, an improvement to communication systems with better stability may be desired.

SUMMARY

The disclosure relates to a communication device. The communication device comprises a base, a signal transceiver, a first antenna array and a second antenna array. The signal transceiver is configured to up-convert or down-convert radio frequency signals. The first antenna array is disposed on the base and electrically coupled to the signal transceiver. The first antenna array is configured to receive or transmit a first radio frequency signal along a first orientation. The first radio frequency signal is transmitted between the first antenna array and the signal transceiver. The second antenna array is disposed on the base and electrically coupled to the first antenna array. The second antenna array is configured to receive or transmit a second radio frequency signal along a second orientation. The second radio frequency signal is transmitted between the second antenna array and the signal transceiver via the first antenna array.

An aspect of the disclosure is related to a communication method applied to a communication device. The communication device comprises a signal transceiver, a first antenna array and a second antenna array. The communication method comprises following steps: receiving or transmitting, by the first antenna array, a first radio frequency signal along a first orientation, wherein the first radio frequency signal is transmitted between the first antenna array and the signal transceiver; and receiving or transmitting, by the second antenna array, a second radio frequency signal along a second orientation, wherein the second radio frequency signal is transmitted between the second antenna array and the signal transceiver via the first antenna array.

It is understood that both the foregoing general description and the following detailed description are by examples, and are intended to provide further explanation of the disclosure as claimed.

BRIEF DESCRIPTION OF THE DRAWINGS

Present disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

As used herein, the direction of terms, such as "Up," "Down," "Left," "Right," "top," "bottom," etc, are understood to be a reference direction of the attached drawings. Therefore, the direction of terms used herein are to describe and understand the present disclosure, and not to limit the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Figure 1:
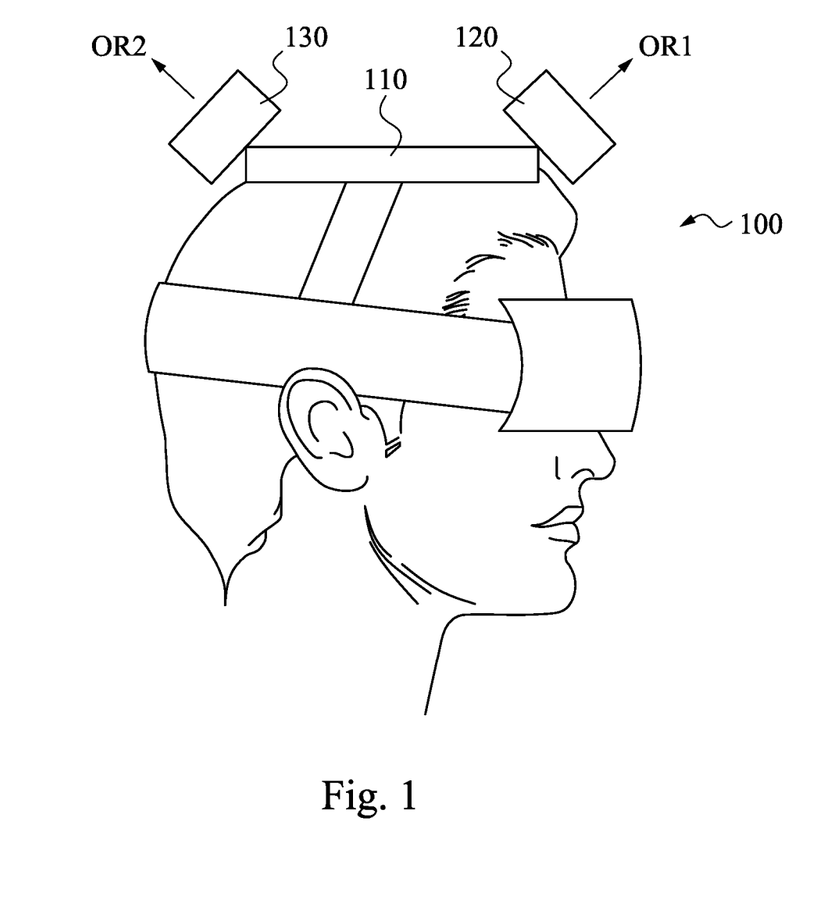
FIG. 1 is a schematic diagram of a communication device according to an embodiment of present disclosure.

FIG. 1 is a schematic diagram of a communication device according to an embodiment of present disclosure. As shown in FIG. 1, in the embodiment, the appearance of the communication device 100 is shown. The communication device 100 includes a base 110, a first antenna array 120 and a second antenna array 130. It is noted that, in the embodiment, the communication device 100 is a head-mounted display. The communication device 100 may be mounted on a user's head. Thus, when the user moves in a space or rotates his/her head, the communication device 100 is moved or rotated accordingly.

As shown in FIG. 1, the first antenna array 120 and the second antenna array 130 are both disposed on the base 110 of the communication device 100. The first antenna array 120 is oriented to a first orientation OR1 to form a signal coverage field, so that the first antenna array 120 may receive/transmit radio frequency signals along the first orientation OR1. Similarly, the second antenna array 130 is oriented to a second orientation OR2 to form a signal coverage field, so that the second antenna array 130 may receive/transmit radio frequency signals along the second orientation OR2. It is noted that the first orientation OR1 is an orientation opposite to the second orientation OR2 over the base 110. The first orientation OR1 of the first antenna array 120 substantially covers a semicircular shaped field centered at the head-mounted display, and the second orientation OR2 of the second antenna array 130 substantially covers another semicircular shaped field centered at the head-mounted display. In this case, an omnidirectional coverage around the communication device 100 may be formed.

In the embodiment, a radio frequency signal transmission between the communication device 100 and a communication base (not shown in figure) disposed in the space may be built via the first antenna array 120 or the second antenna array 130. The communication base may be wirelessly coupled to a host computer (not shown in figure). In this case, the present disclosure improves a coupling arrangement between the head-mounted display and the host computer, such that the communication device 100 is able to be directly connected to the host computer without physical lines. When the user is immersed in a virtual reality environment provided by the host computer, information from the host computer may be carried by the radio frequency signals transmitting from the communication base. The first antenna array 120 or the second antenna array 130 of the communication device 100 may receive the radio frequency signals. Thus, a wireless signal transmission between the communication device 100 and the host computer may be built. Accordingly, without the limitations of physical transmission line, the activity range is thus increased, and the user's experience is significantly improved.

In the embodiment, the first antenna array 120 and the second antenna array 130 are both millimeter wave antenna array. As mentioned, since the communication device 100 may be the head-mounted display, the communication device 100 is moved or rotated correspondingly when the user moves in the space or rotates his/her head. Under this condition, if at least one of the first orientation OR1 of the first antenna array 120 or the second orientation OR2 of the second antenna array 130 is substantially oriented to the communication base, the signal transmission between the communication device 100 and the host computer may be held.

Figure 2:
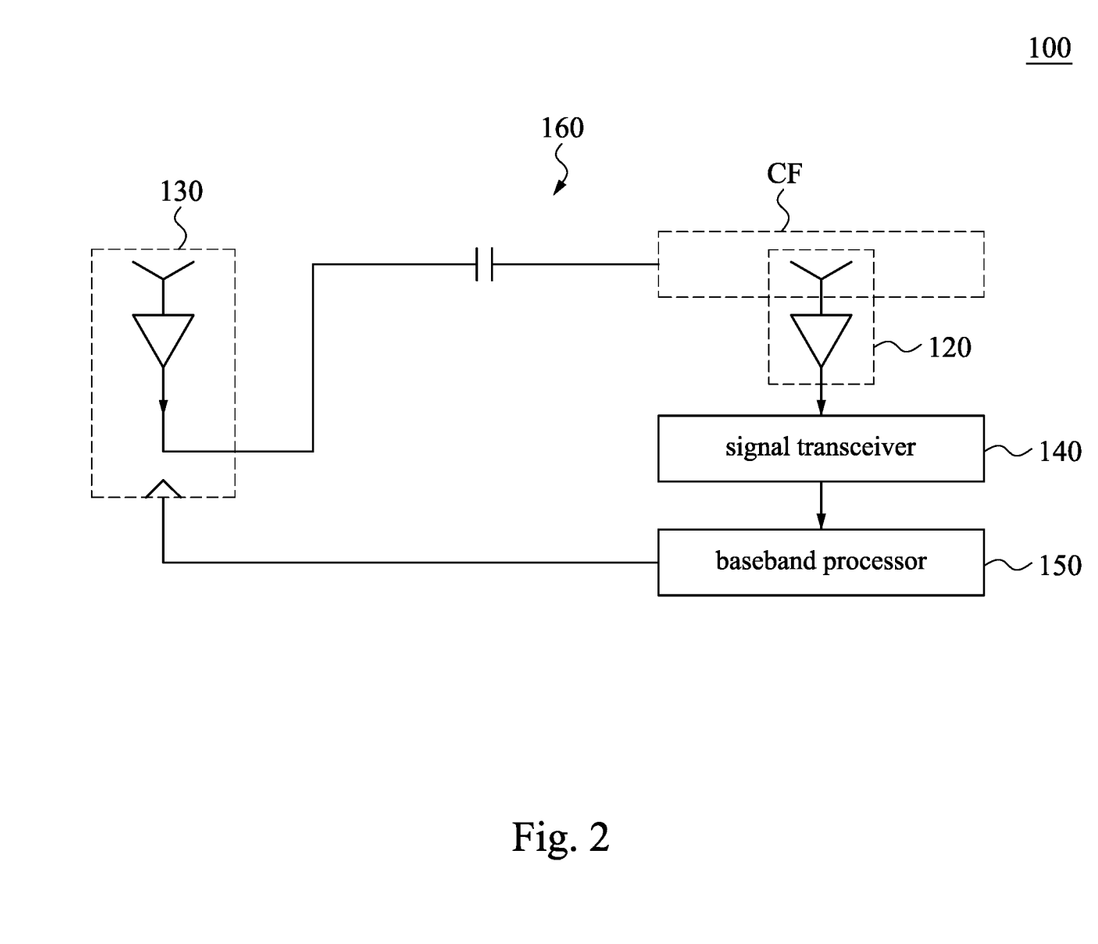
FIG. 2 is a schematic diagram of a communication device according to an embodiment of present disclosure.

FIG. 2 is a schematic diagram of a communication device according to an embodiment of present disclosure. As shown in FIG. 2, in the embodiment, a circuit of the communication device 100 of FIG. 1 is illustrated. Reference may be made to FIG. 1 for appearance of the communication device 100. As shown in FIG. 2, the first antenna array 120 is electrically coupled to a signal transceiver 140. The signal transceiver 140 is configured to up-convert or down-convert radio frequency signals. More specifically, the signal transceiver 140 is configured to down-convert radio frequency signals with high frequencies to intermediate frequency signals. Alternatively, the signal transceiver 140 is also configured to up-convert intermediate frequency signals to radio frequency signals with high frequencies.

As shown in FIG. 2, in the embodiment, the signal transceiver 140 is electrically coupled to a baseband processor 150. The baseband processor 150 is configured to process radio frequency signals with a baseband operation. In particular, the baseband processor 150 is configured to receive intermediate frequency signals from the signal transceiver 140 and process the intermediate frequency signals with the baseband operation. Similarly, the signal transceiver 140 is configured to process baseband signals with up-conversion operation. The signal transceiver 140 up-converts the baseband signal to intermediate frequency signal, then the intermediate frequency signal may be sent to the signal transceiver 140.

As shown in FIG. 2, in the embodiment, the second antenna array 130 is electrically coupled to the first antenna array 120 via a coupling structure 160. In particular, the coupling structure 160 has a coupling field CF that covers the first antenna array 120. In some embodiments, the coupling structure 160 includes a flexible printed circuit board and a directional antenna. One end of the flexible printed circuit board of the coupling structure 160 is electrically coupled to the second antenna array 130, and another end of the coupling structure 160 of the coupling structure 160 is electrically coupled to the directional antenna. The coupling field CF is a beamforming coverage field of the directional antenna. Through the extension of the flexible printed circuit board, the beamforming coverage field of the directional antenna may cover the first antenna array 120.

Furthermore, in some embodiments, the coupling structure 160 includes a flexible printed circuit board and an oscillation structure. One end of the flexible printed circuit board of the coupling structure 160 is electrically coupled to the second antenna array 130, and another end of the coupling structure 160 of the coupling structure 160 is electrically coupled to the oscillation structure. The coupling field CF is an oscillation coverage field of the oscillation structure. Through the extension of the flexible printed circuit board, the oscillation coverage field of the directional antenna may cover the first antenna array 120.

Referring to FIG. 1 and FIG. 2, in the embodiment, when the second antenna array 130 receives the radio frequency signals transmitted by the communication base along the second orientation OR2, the radio frequency signals may be transmitted to the first antenna array 120 via the coupling field CF of the coupling structure 160 if the coupling structure 160 is enabled. The radio frequency signals may be transmitted from the first antenna array 120 to the signal transceiver 140. Then, the radio frequency signals may be down-converted by the signal transceiver 140 and processed by the baseband processor 150. In the embodiment, when the first antenna array 120 receives the radio frequency signals transmitted by the communication base along the first orientation OR1, the radio frequency signals may be transmitted to the signal transceiver 140. Then, the radio frequency signals may be down-converted by the signal transceiver 140 and processed by the baseband processor 150. As described, even though the communication device 100 is moved or rotated, at least one of the first antenna array 120 or the second antenna array 130 on the communication device 100 may exchange radio frequency signals with the communication base efficiently.

It should be noted that, in the embodiment, the baseband processor 150 is electrically coupled to the second antenna array 130, thus the baseband processor 150 may control the second antenna array 130. In the embodiment, the second antenna array 130 includes an amplifier. When the baseband processor 150 receives down-converted radio frequency signals from the signal transceiver 140, the baseband processor 150 may measure a signal strength of the radio frequency signal. When the signal strength is lower than a strength threshold, the baseband processor 150 may send an enabling signal to the second antenna array 130, in order to increase a gain of the amplifier. Thus, the second antenna array 130 may be enabled. If the signal strength measured by the baseband processor 150 is still lower than the strength threshold after a period, the baseband processor 150 sends a disabling signal to the second antenna array 130, in order to reduce the gain of the amplifier. Thus, the second antenna array 130 may be disabled.

In view of foregoing embodiment, the baseband processor 150 may enable the second antenna array 130 when the signal strength is low, and determine whether to send the disabling signal, based on a comparison between the signal strength the strength threshold, after the period. In this case, when the second orientation OR2 is not oriented to the communication base, the baseband processor 150 may disable the second antenna array 130 for better power consumption.

Figure 3:
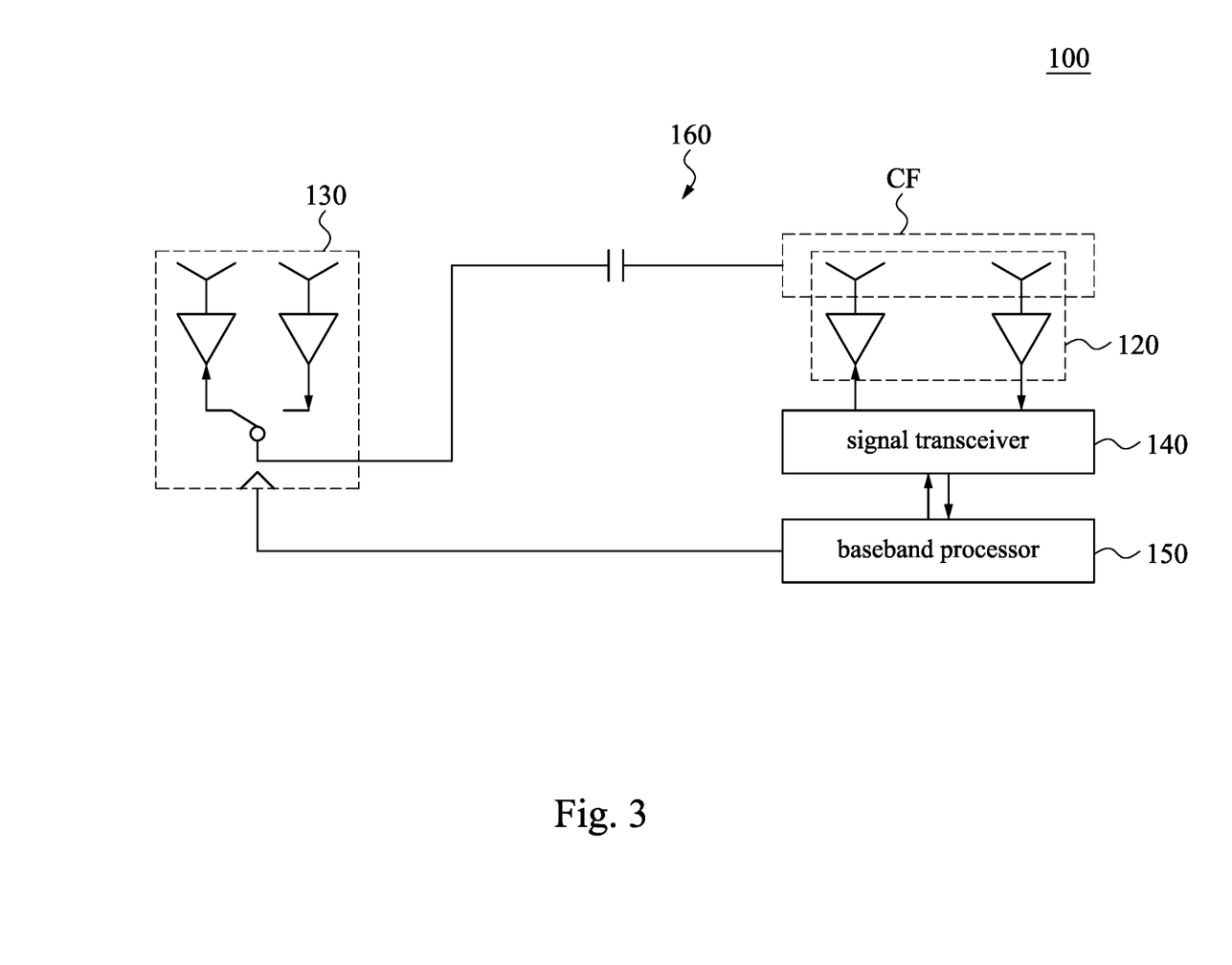
FIG. 3 is a schematic diagram of a communication device according to an embodiment of present disclosure.

FIG. 3 is a schematic diagram of a communication device according to an embodiment of present disclosure. As shown in FIG. 3, in the embodiment, a circuit of the communication device 100 of FIG. 1 is illustrated. If the appearance of the communication device 100 is concerned, reference may be made to FIG. 1. With reference to both FIG. 1 and FIG. 3, similar to the embodiment of FIG. 2, in the embodiment, the signal transceiver 140 is electrically coupled to the baseband processor 150, and the second antenna array 130 is electrically coupled to the first antenna array 120 via the coupling structure 160. If the operations of the signal transceiver 140, the baseband processor 150 and the coupling structure 160 are concerned, reference may be made to the embodiment of FIG. 2.

It is noted that, in the embodiment, the first antenna array 120 and the second antenna array 130 both include a receiving antenna and an transmitting antenna. The receiving antenna is configured to receive the radio frequency signals and the transmitting antenna is configured to transmit radio frequency signals. The baseband processor 150 may control whether to enable the receiving antenna of the second antenna array 130 or the transmitting antenna of the second antenna array 130.

As mentioned, when the receiving antenna of the second antenna array 130 is enabled, the second antenna array 130 may receive radio frequency signals along the second orientation OR2. If the amplifier of the second antenna array 130 is enabled, the radio frequency signals may be transmitted to the receiving antenna of the first antenna array 120 via the coupling field CF of the coupling structure 160. The first antenna array 120 may send the radio frequency signals to the signal transceiver 140 for down-conversion. Then the down-converted signals may be sent to the baseband processor 150 for baseband operation. When the receiving antenna of the first antenna array 120 receives the radio frequency signals along the first orientation OR1, the first antenna array 120 may send the radio frequency signals to the signal transceiver 140 for down-conversion. Then the down-converted signals may be sent to the baseband processor 150 for baseband operation.

It is noted that, in the embodiment, the first antenna array 120 and the second antenna array 130 may transmit radio frequency signals. As shown in FIG. 1 and FIG. 3, the signals generated by the baseband processor 150 may be transmitted to the signal transceiver 140 for up-conversion. The signal transceiver 140 then sends the up-converted signals to the transmitting antenna of the first antenna array 120, and the first antenna array 120 may transmit the radio frequency signals along the first orientation OR1. Furthermore, the radio frequency signals may be transmitted to the second antenna array 130 via the coupling field CF of the coupling structure 160. If the amplifier of the second antenna array 130 is enabled, the transmitting antenna of the second antenna array 130 may transmit the radio frequency signals along the second orientation OR2. It is to say, if the amplifier is enabled, the up-converted radio frequency signals sent from the signal transceiver 140 may be transmitted by the first antenna array 120 and the second antenna array 130 simultaneously. If the amplifier is disabled, the up-converted radio frequency signals sent from the signal transceiver 140 may be transmitted by the first antenna array 120 solely.

Figure 4:
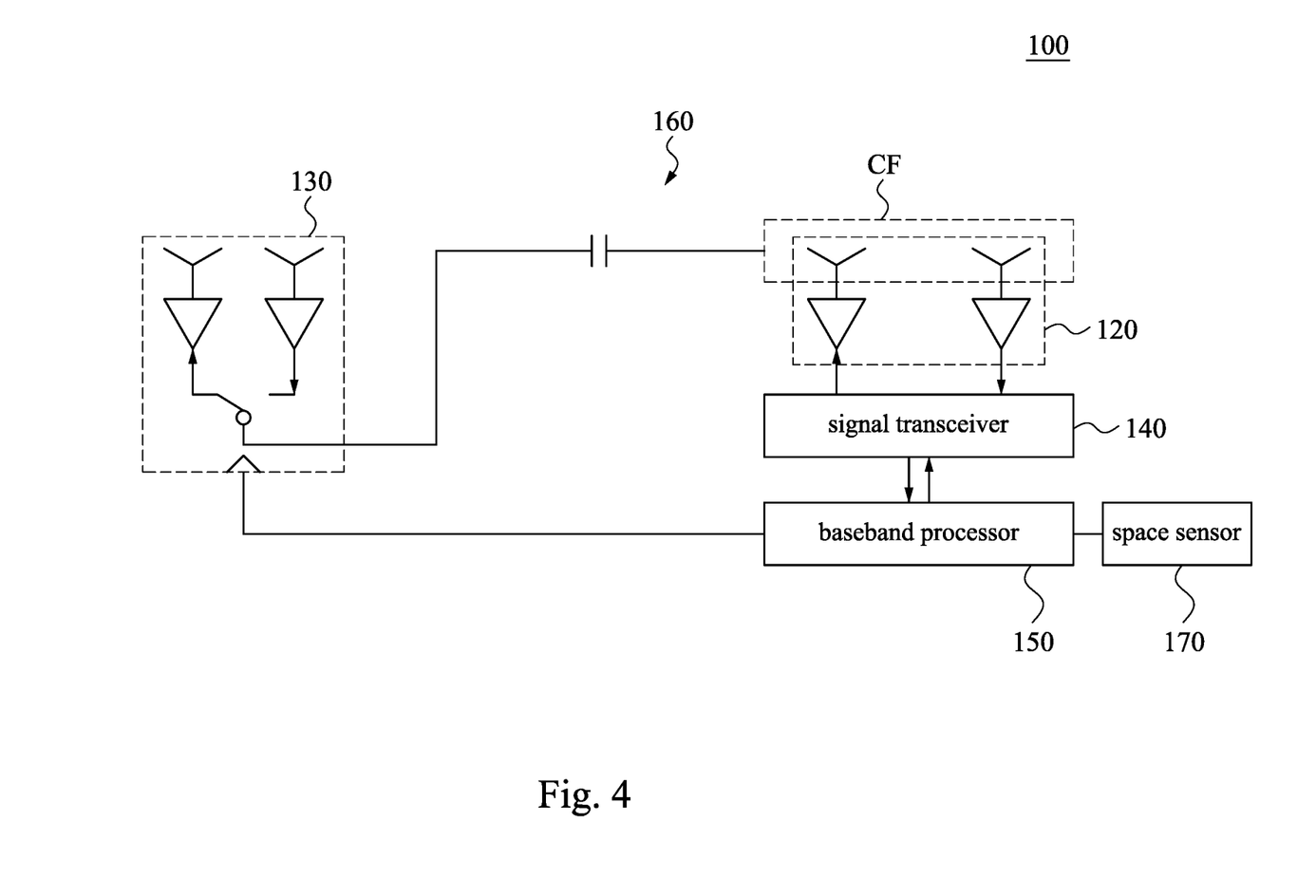
FIG. 4 is a schematic diagram of a communication device according to an embodiment of present disclosure.

FIG. 4 is a schematic diagram of a communication device according to an embodiment of present disclosure. As shown in FIG. 4, in the embodiment, a circuit of the communication device 100 of FIG. 1 is illustrated. If the appearance of the communication device 100 is concerned, FIG. 1 may be referred. With reference to both of FIG. 1 and FIG. 4, similar to the embodiments shown in FIG. 2 and FIG. 3, in the embodiment, the signal transceiver 140 is electrically coupled to the baseband processor 150, and the second antenna array 130 is electrically coupled to the first antenna array 120 via the coupling structure 160. Regarding the operations of the signal transceiver 140, the baseband processor 150 and the coupling structure 160, references can be made to the embodiments of FIG. 2 and FIG. 3.

Comparing to the embodiment of FIG. 3, in the embodiment, the communication device 100 further includes a space sensor 170. The space sensor 170 is electrically coupled to the baseband processor 150. The space sensor 170 is configured to detect spatial information indicating a relative position of the communication device 100 relative to the communication base. More specifically, the space sensor 170 is configured to detect the relative position between the first antenna array 120/second antenna array 130, settled on the base 110, and the communication base. The space sensor 170 may send the spatial information to the baseband processor 150, and the baseband processor 150 may determine whether to send the enabling signal or disabling signal to the second antenna array 130 according to the spatial information. In this case, when the communication base is not oriented to the ranged covered by the second orientation OR2, the baseband processor 150 may disable the second antenna array 130 to reduce unnecessary power consumption.

Figure 5:
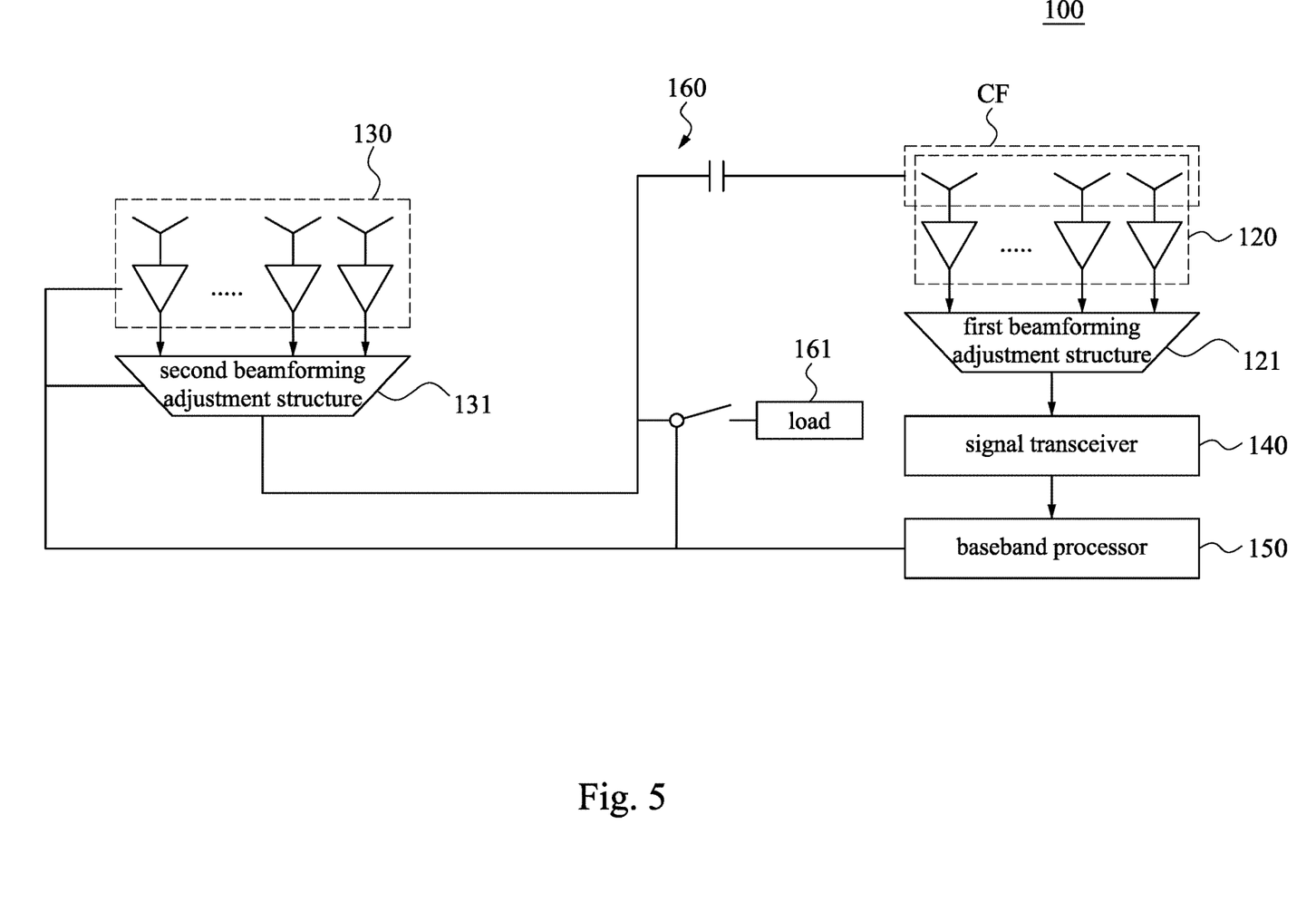
FIG. 5 is a schematic diagram of a communication device according to an embodiment of present disclosure.

FIG. 5 is a schematic diagram of a communication device according to an embodiment of present disclosure. As shown in FIG. 5, in the embodiment, a circuit of the communication device 100 of FIG. 1 is illustrated. If the appearance of the communication device 100 is concerned, reference can be made to FIG. 1. Similar to the embodiments shown in FIG. 2, in the embodiment, the signal transceiver 140 is electrically coupled to the baseband processor 150, and the second antenna array 130 is electrically coupled to the first antenna array 120 via the coupling structure 160. Regarding the operations of the signal transceiver 140, the baseband processor 150 and the coupling structure 160, references can be made to the embodiments of FIG. 2 and FIG. 3.

It is noted that, in the embodiment, the first antenna array 120 includes a plurality of receiving antennas controlled by a first beamforming adjustment structure 121. Similarly, the second antenna array 130 also includes a plurality of receiving antennas controlled by a second beamforming adjustment structure 131. In particular, the first beamforming adjustment structure 121 and the second beamforming adjustment structure 131 are both electrically coupled to the baseband processor 150. The baseband processor 150 may control the first beamforming adjustment structure 121 and the second beamforming adjustment structure 131 based on a beamforming direction parameter. The beamforming coverage field of the first antenna array 120 and the second antenna array 130 may be adjusted according to the beamforming direction parameter. Thus, the first antenna array 120 and the second antenna array 130 may receive the radio frequency signals from the communication base in a decent manner.

Moreover, in the embodiment, the baseband processor 150 is electrically coupled to the coupling structure 160, and the coupling structure 160 includes a load 161. When the baseband processor 150 sends the enabling signal to the coupling structure 160, the coupling structure 160 electrically connects the second antenna array 130 with the first antenna array 120 so that the coupling structure 160 is enabled for signal transmission. When the baseband processor 150 sends the disabling signal to the coupling structure 160, the coupling structure 160 electrically connects the second antenna array 130 the load 161 according to the disabling signal. In this case, the coupling structure 160 is disabled, and the radio frequency signals received by the second antenna array 130 are guided to the load 161.

Similar to foregoing embodiments, when the baseband processor 150 receives down-converted signals from the signal transceiver 140, the baseband processor 150 may measure the signal strength of the radio frequency signal. When the signal strength is lower than the strength threshold, the baseband processor 150 may send the enabling signal to the coupling structure 160. In the meantime, the baseband processor 150 may send the beamforming direction parameter to the second beamforming adjustment structure 131, in order to control the receiving antennas of the second antenna array 130. Based on the beamforming direction parameter, the baseband processor 150 may adjust the second orientation OR2 of the second antenna array 130, so that the second orientation OR2 may be oriented to the communication base more precisely. If the signal strength measured by the baseband processor 150 is still lower than the strength threshold after a period, it is indicated that the communication base may be out of the signal coverage directed by the second orientation OR2. Then, the baseband processor 150 sends the disabling signal to the coupling structure 160 in order to disable the coupling structure 160. Furthermore, the baseband processor 150 may send the beamforming direction parameter to the first beamforming adjustment structure 121, in order to control the receiving antennas of the first antenna array 120. Based on the beamforming direction parameter, the baseband processor 150 may adjust the first orientation OR1 of the first antenna array 120 so that the first orientation OR1 may be oriented to the communication base more precisely.

Figure 6:
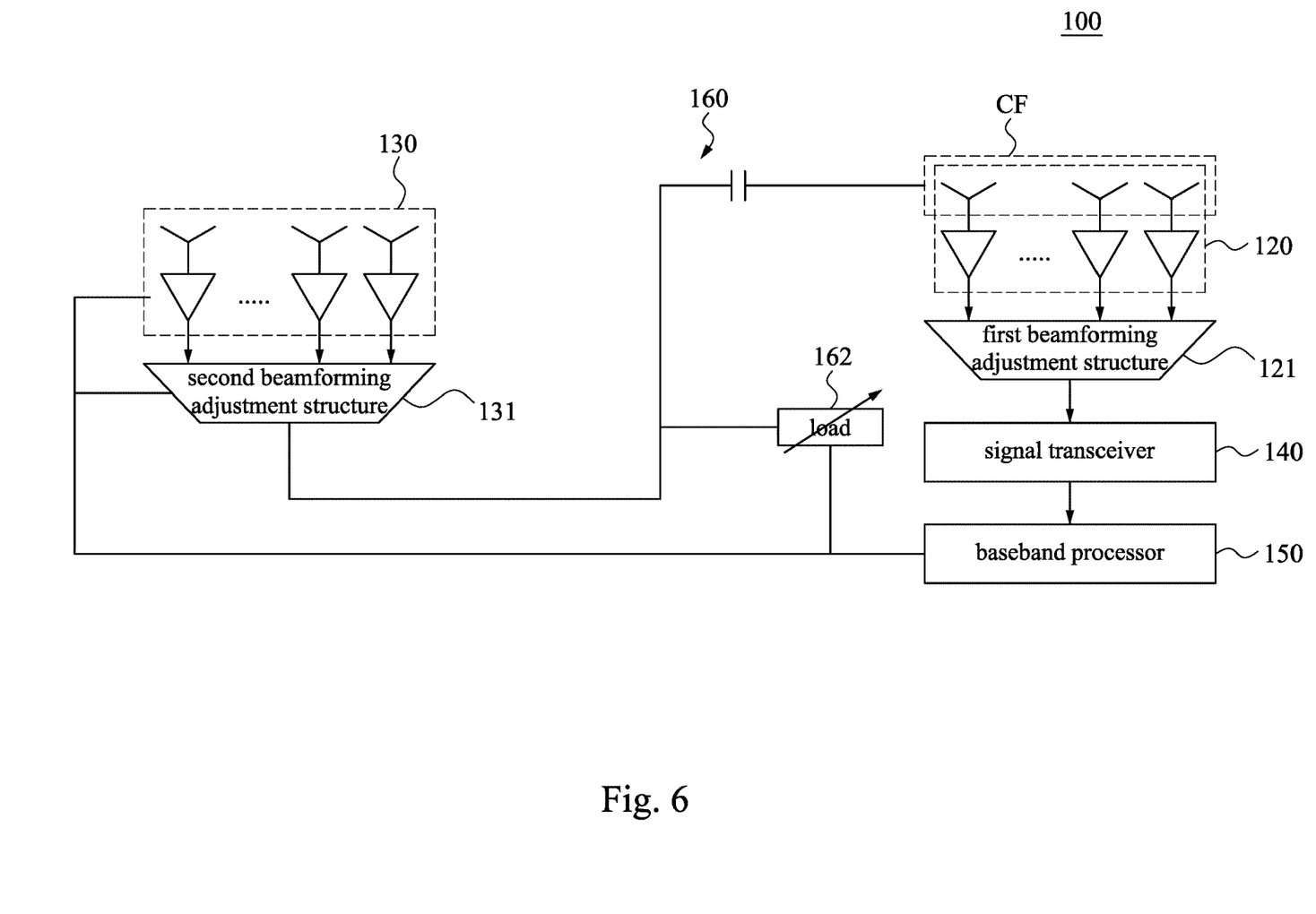
FIG. 6 is a schematic diagram of a communication device according to an embodiment of present disclosure.

FIG. 6 is a schematic diagram of a communication device according to an embodiment of present disclosure. As shown in FIG. 6, in the embodiment, a circuit of the communication device 100 of FIG. 1 is illustrated. If the appearance of the communication device 100 is concerned, reference can be made to FIG. 1. Similar to the embodiments shown in FIG. 5, in the embodiment, the signal transceiver 140 is electrically coupled to the baseband processor 150, and the second antenna array 130 is electrically coupled to the first antenna array 120 via the coupling structure 160. Regarding the operations of the signal transceiver 140, the baseband processor 150 and the coupling structure 160, references can be made to the embodiments of FIG. 2 and FIG. 5.

In the embodiment, the baseband processor 150 is electrically coupled to the coupling structure 160, and the coupling structure 160 includes a load 162. When the baseband processor 150 sends the enabling signal to the coupling structure 160, the coupling structure 160 reduces a resistance of the load 162 according to the enabling signal. In this case, the coupling structure 160 is enabled, and the coupling structure 160 electrically connects the second antenna array 130 with the first antenna array 120. When the baseband processor 150 sends the disabling signal to the coupling structure 160, the coupling structure 160 increases the resistance of the load 162 according to the disabling signal. The coupling structure 160 is therefore disabled.

In the embodiment, regarding the mechanisms that the baseband processor 150 sends the enabling signal, the disabling signal and the beamforming direction parameter, references can be made to the embodiment of FIG. 5.

Figure 7:
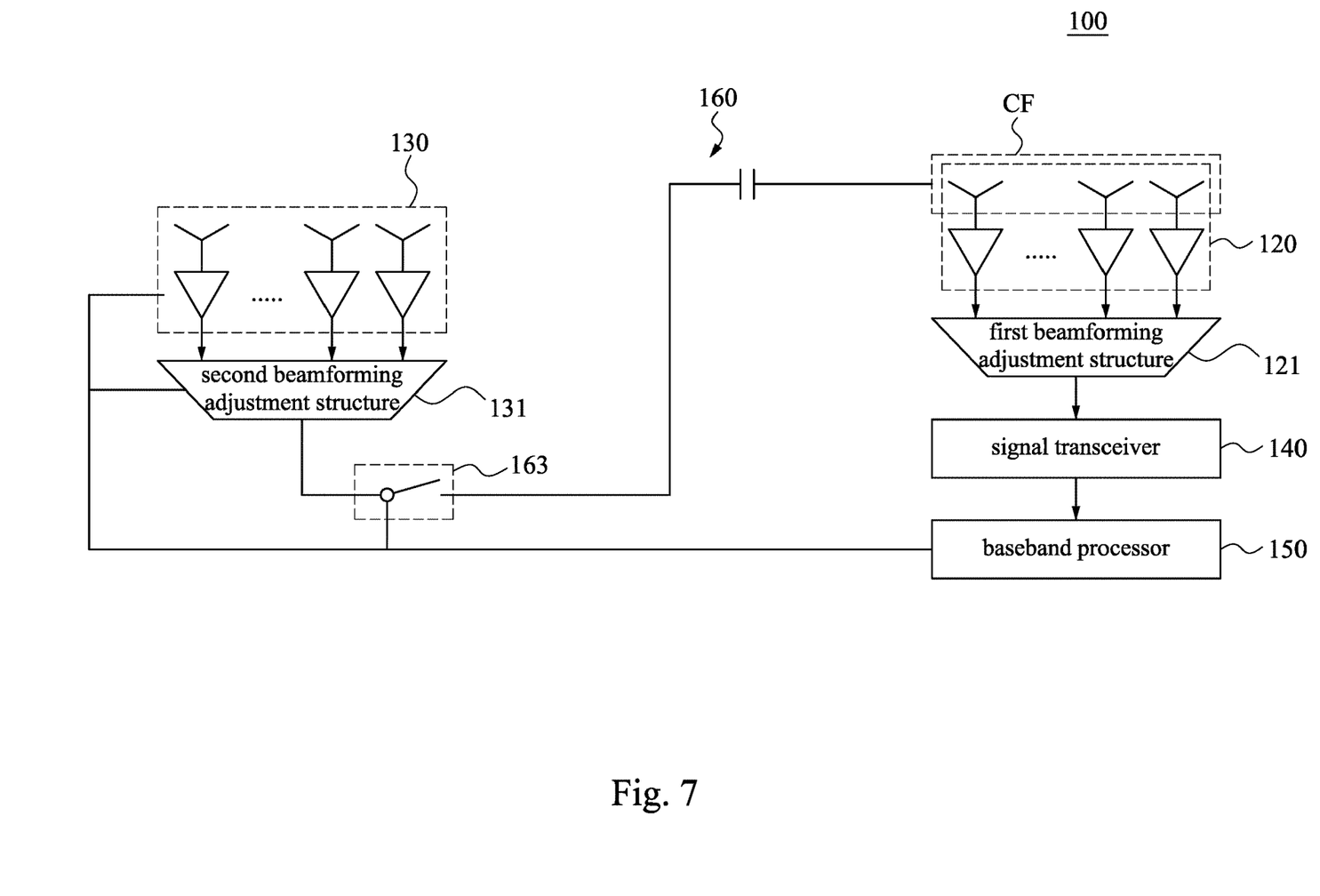
FIG. 7 is a schematic diagram of a communication device according to an embodiment of present disclosure.

FIG. 7 is a schematic diagram of a communication device according to an embodiment of present disclosure. As shown in FIG. 7, in the embodiment, a circuit of the communication device 100 of FIG. 1 is illustrated. If the appearance of the communication device 100 is concerned, reference can be made to FIG. 1. Similar to the embodiments shown in FIG. 5, in the embodiment, the signal transceiver 140 is electrically coupled to the baseband processor 150, and the second antenna array 130 is electrically coupled to the first antenna array 120 via the coupling structure 160. Regarding the operations of the signal transceiver 140, the baseband processor 150 and the coupling structure 160, references can be made to the embodiments of FIG. 2 and FIG. 5.

In the embodiment, the baseband processor 150 is electrically coupled to the coupling structure 160, and the coupling structure 160 includes a switch 163. When the baseband processor 150 sends the enabling signal to the coupling structure 160, the switch 163 of the coupling structure 160 is turned on according to the enabling signal. The coupling structure 160 is enabled to electrically connect the second antenna array 130 with the first antenna array 120. When the baseband processor 150 sends the disabling signal to the coupling structure 160, the switch 163 of the coupling structure 160 is turned off according to the disabling signal. The coupling structure 160 is therefore disabled.

In the embodiment, regarding the mechanisms that the baseband processor 150 sends the enabling signal, the disabling signal and the beamforming direction parameter, the embodiment of FIG. 5 may be referred.

Figure 8:
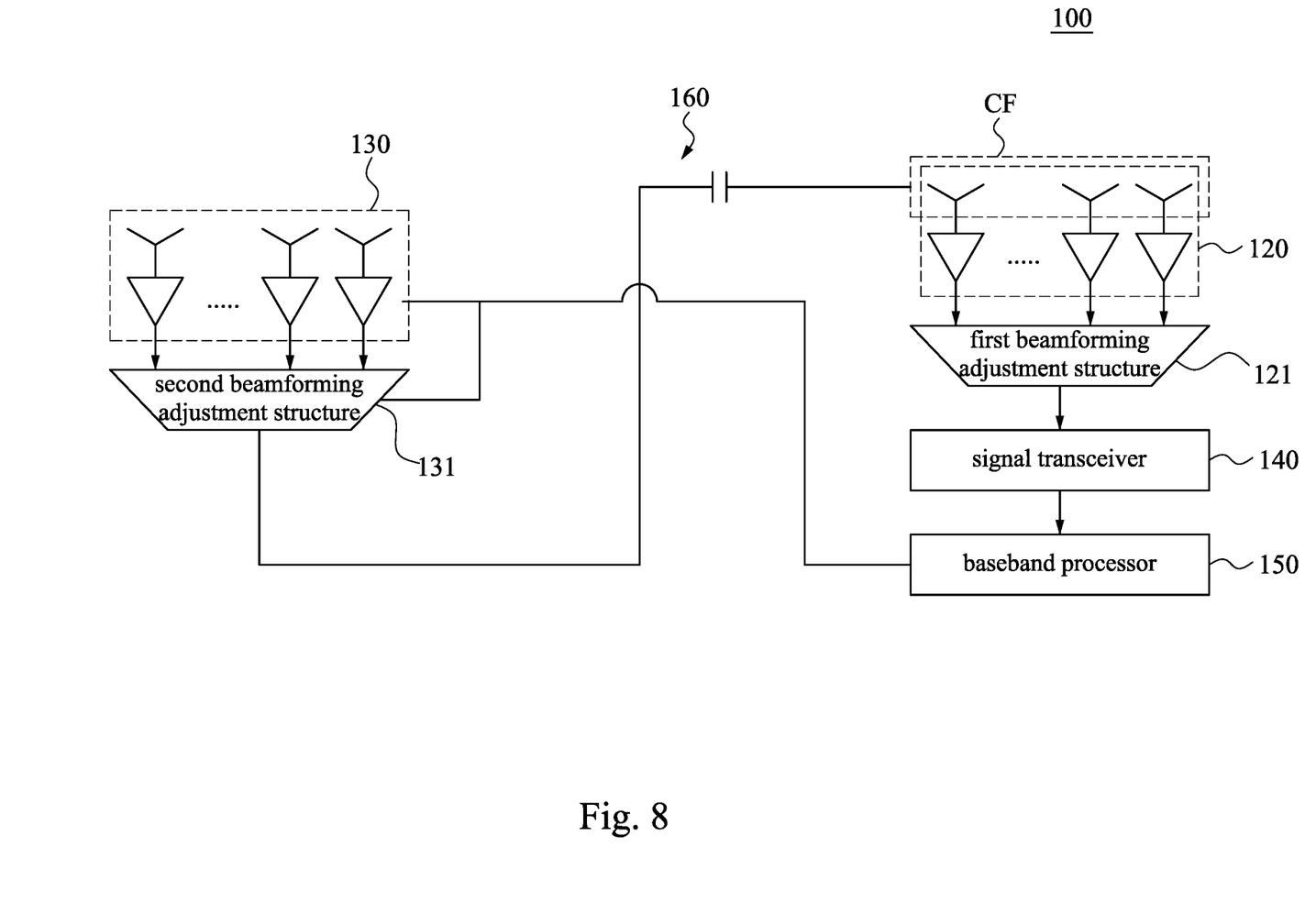
FIG. 8 is a schematic diagram of a communication device according to an embodiment of present disclosure.

FIG. 8 is a schematic diagram of a communication device according to an embodiment of present disclosure. As shown in FIG. 8, in the embodiment, a circuit of the communication device 100 of FIG. 1 is illustrated. If the appearance of the communication device 100 is concerned, reference can be made to FIG. 1. Similar to the embodiments shown in FIG. 5, in the embodiment, the signal transceiver 140 is electrically coupled to the baseband processor 150, and the second antenna array 130 is electrically coupled to the first antenna array 120 via the coupling structure 160. Regarding the operations of the signal transceiver 140, the baseband processor 150 and the coupling structure 160, references can be made to the embodiments of FIG. 2 and FIG. 5.

In the embodiment, the baseband processor 150 is electrically coupled to the second antenna array 130. When the baseband processor 150 sends the enabling signal to the second antenna array 130, the second antenna array 130 increases the gain of the amplifiers connected to each receiving antenna according to the enabling signal. The second antenna array 130 is enabled to send the radio frequency signals to the first antenna array 120 via the coupling structure 160. When the baseband processor 150 sends the disabling signal to the second antenna array 130, the second antenna array 130 reduces the gain output of the amplifiers connected to each receiving antenna according to the disabling signal. The second antenna array 130 is disabled so that the radio frequency signals may not be sent to the first antenna array 120 via the coupling structure 160.

In the embodiment, regarding the mechanisms that the baseband processor 150 sends the enabling signal, the disabling signal and the beamforming direction parameter, the embodiment of FIG. 5 may be referred.

It is noted that the embodiments shown in FIG. 5-8 are for example, not intend to limit the scope of present disclosure. In some embodiments, the first antenna array 120 and the second antenna array 130 of the communication device 100 both include a plurality of receiving antennas and a plurality of transmitting antennas. In this case, both of the first antenna array 120 and the second antenna array 130 may receive or transmit radio frequency signals. In some other embodiments, the communication device 100 also includes the space sensor 170 shown in FIG. 4. In this case, the baseband processor 150 may send the enabling signal or the disabling signal according to the spatial information so that the power consumption may be reduced.

Figure 9:
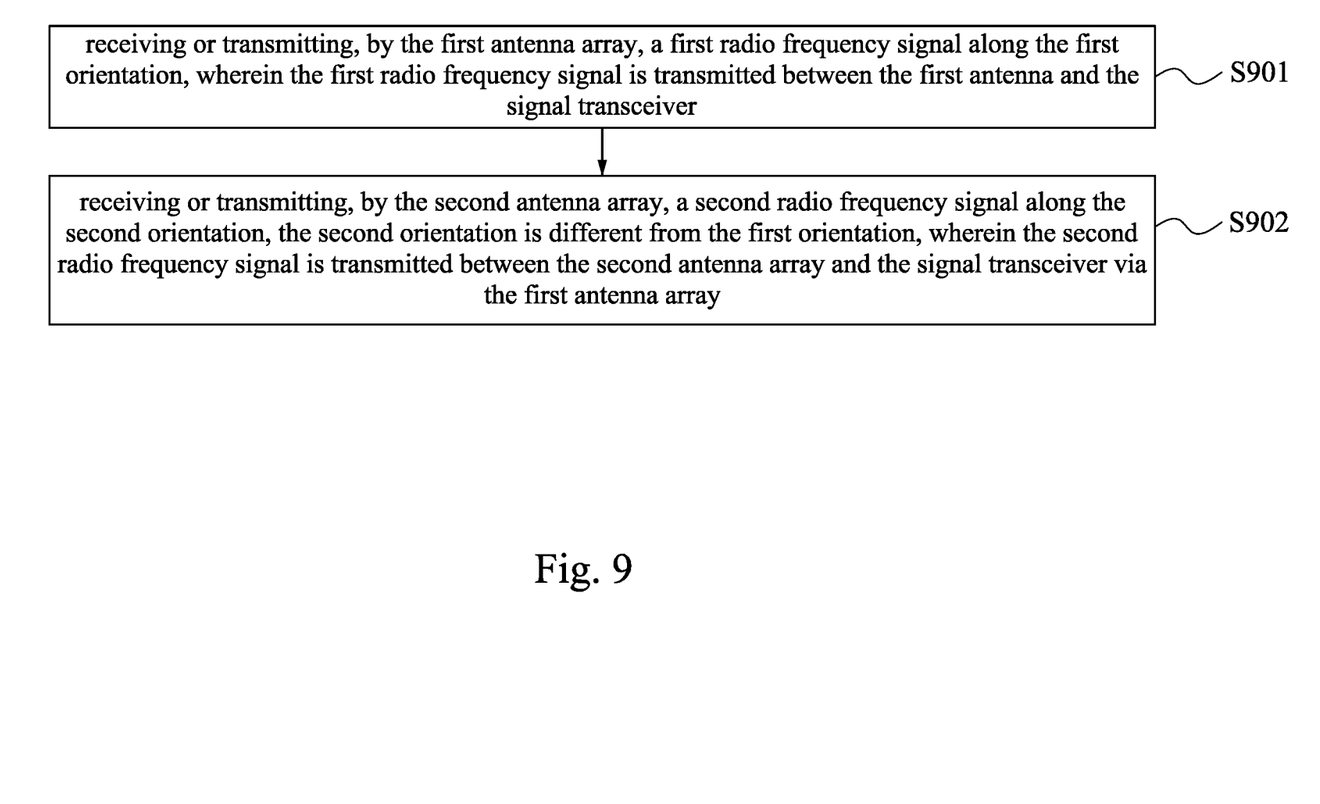
FIG. 9 is a flow chart of a communication method according to an embodiment of present disclosure.

FIG. 9 is a flow chart of a communication method according to an embodiment of present disclosure. In the embodiment, the communication method is applied by the communication device 100 shown in FIG. 1-8. Regarding detailed operations of the components of the communication device 100, the embodiments of FIG. 1-8 may be referenced. The steps of the communication method would be explained in detail in following paragraphs.

Step S901: receiving or transmitting, by the first antenna array 120, a first radio frequency signal along the first orientation OR1, wherein the first radio frequency signal is transmitted between the first antenna 120 and the signal transceiver 140. As shown in FIG. 1-7, the first antenna array 120 of the communication device 100 is disposed on the base 110, and the first antenna array 120 is oriented to the first orientation OR1. When the first antenna array 120 receives the radio frequency signals from the communication base along the first orientation OR1, the first antenna array 120 may send the radio frequency signals to the signal transceiver 140 for down-conversion. Then the down-converted signals may be sent to the baseband processor 150 for baseband operation. Similarly, the baseband processor 150 may send the baseband signals to the signal transceiver 140 for up-conversion. The up-converted radio frequency signals may be sent to the first antenna array 120, and the first antenna array 120 may send the radio frequency signals along the first orientation OR1.

Step S902: receiving or transmitting, by the second antenna array 130, a second radio frequency signal along the second orientation OR2, the second orientation OR2 is different from the first orientation OR1, wherein the second radio frequency signal is transmitted between the second antenna array 130 and the signal transceiver 140 via the first antenna array 120. As shown in FIG. 1-7, the second antenna array 130 of the communication device 100 is disposed on the base 110, and the second antenna array 130 is oriented to the second orientation OR2. When the second antenna array 130 receives the radio frequency signals from the communication base along the second orientation OR2, the radio frequency signals may be sent to the first antenna array 120 via the coupling field CF of the coupling structure 160 if the coupling structure 160 is enabled. The first antenna array 120 may send the radio frequency signals to the signal transceiver 140 for down-conversion, and the down-converted signals may be sent to the baseband processor 150 for baseband operation. Similarly, the baseband signals sent from the baseband processor 150 may be transmitted to the signal transceiver 140 for up-conversion, and the up-converted radio frequency signals may be sent to the first antenna array 120. If the coupling structure 160 is enabled, the radio frequency signal may be sent to the second antenna array 130 via the coupling field CF of the coupling structure 160. Then, the second antenna array 130 may transmit the radio frequency signals along the second orientation OR2.

As mentioned, the present disclosure provides an improved connection approach between the head-mounted display and the host computer. The physical connection limitation between the communication device 200 and the host computer is removed. When the user is immersed in the virtual reality environment provided by the host computer, at least one of the first antenna array 120 and the second antenna array 130 of the communication device 100 may exchange signals with the communication base. The user experience is therefore improved due to the enlarged activity range brought by the wireless communication. Furthermore, based on the arrangements shown in the foregoing embodiments, a cost on hardware of the communication device 100 of the present disclosure is saved, and the communication device 100 may enable or disable the coupling structure 160 based on the orientations of the first antenna array 120 or the second antenna array 130, in order to reduce the power consumption of the communication device 100.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication device, comprising:
   a base;
   a signal transceiver, configured to up-convert or down-convert radio frequency signals;
   a first antenna array disposed on the base and electrically coupled to the signal transceiver, the first antenna array configured to receive or transmit a first radio frequency signal along a first orientation, wherein the first radio frequency signal is transmitted between the first antenna array and the signal transceiver;

a second antenna array disposed on the base and electrically coupled to the first antenna array, the second antenna array configured to receive or transmit a second radio frequency signal along a second orientation, wherein the second radio frequency signal is transmitted between the second antenna array and the signal transceiver via the first antenna array; and a coupling structure, the second antenna array is electrically coupled to the first antenna array via the coupling structure, wherein the coupling structure is selectively enabled or disabled for selectively transferring or not transferring the second radio frequency signal from the second antenna array to the first antenna array.

2. The communication device of claim 1, wherein when the first antenna array receives the first radio frequency signal along the first orientation, the first radio frequency signal is transmitted from the first antenna array to the signal transceiver.

3. The communication device of claim 1, wherein the first radio frequency signal is transmitted from the signal transceiver to the first antenna array, and the first antenna array transmits the first radio frequency signal along the first orientation.

4. The communication device of claim 1, wherein when the second antenna array receives the second radio frequency signal along the second orientation, the second radio frequency signal is sequentially transmitted from the second antenna array and the first antenna array to the signal transceiver.

5. The communication device of claim 1, wherein the second radio frequency signal is sequentially transmitted from the signal transceiver and the first antenna array to the second antenna array, and the second antenna array transmits the second radio frequency signal along the second orientation.

6. The communication device of claim 1, wherein the coupling structure configured to have a coupling field, in order to cover the first antenna array, wherein the second radio frequency signal is transmitted between the first antenna array and the second antenna array via the coupling field.

7. The communication device of claim 6, wherein the coupling structure comprises a directional antenna, and the coupling field is a beamforming coverage field of the directional antenna.

8. The communication device of claim 6, wherein the coupling structure comprises an oscillation structure, and the coupling field is an oscillation coverage field of the oscillation structure.

9. The communication device of claim 6, further comprising:

a baseband processor electrically coupled to the signal transceiver, wherein the baseband processor is configured to perform a baseband operation on the radio frequency signals, the baseband processor receives the first or the second radio frequency signal which is down-converted from the signal transceiver, and the baseband processor sends the first or the second radio frequency signal which is not up-converted to the signal transceiver.

10. The communication device of claim 9, wherein the baseband processor is electrically coupled to the coupling structure, the baseband processor sends an enabling signal to the coupling structure in order to enable the coupling structure, and the baseband processor sends an disabling signal to the coupling structure in order to disable the coupling structure.

11. The communication device of claim 10, wherein the coupling structure comprises an amplifier, the coupling structure increases a gain of the amplifier according to the enabling signal, and the coupling structure reduces the gain of the amplifier according to the disabling signal.

12. The communication device of claim 10, wherein the coupling structure comprises a switch, the coupling structure turns on the switch according to the enabling signal, and the coupling structure turns off the switch according to the disabling signal.

13. The communication device of claim 10, wherein the coupling structure comprises a load, the coupling structure electrically connects the second antenna array to the first antenna array according to the enabling signal, and the coupling structure electrically connects the second antenna array to the load according to the disabling signal.

14. The communication device of claim 10, wherein the coupling structure comprises a load, the coupling structure reduces a resistance of the load according to the enabling signal, and the coupling structure increases the resistance of the load according to the disabling signal.

15. The communication device of claim 10, wherein the baseband processor is configured to measure a signal strength of the first radio frequency signal or the second radio frequency signal, and when the signal strength is lower than a strength threshold, the baseband processor sends the enabling signal to the coupling structure.

16. The communication device of claim 15, wherein if the signal strength is still lower than the strength threshold after a period, the baseband processor sends the disabling signal to the coupling structure.

17. The communication device of claim 15, wherein the second antenna array is electrically coupled to the coupling structure via a beamforming adjustment structure, when the signal strength is lower than the strength threshold, the baseband processor sends a beamforming direction parameter to the beamforming adjustment structure, in order to re-orient the second orientation of the second antenna array.

18. The communication device of claim 10, further comprising:

a space sensor electrically coupled to the baseband processor, wherein the space sensor is configured to detect a position of the communication device relative to a communication base, in order to generate spatial information, the space sensor sends the spatial information to the baseband processor, and the baseband processor determines whether to send the enabling signal or the disabling signal to the coupling structure according to the spatial information.

19. The communication device of claim 1, wherein the base is disposed on a top surface of a head-mounted display, and the first orientation is opposite to the second orientation over the base.

20. A communication method, applied to a communication device as claimed in claim 1, the communication method comprising:

receiving or transmitting, by the first antenna array, a first radio frequency signal along a first orientation, wherein the first radio frequency signal is transmitted between the first antenna array and the signal transceiver; and receiving or transmitting, by the second antenna array, a second radio frequency signal along a second orientation, wherein the second radio frequency signal is transmitted between the second antenna array and the signal transceiver via the first antenna array.

\* \* \* \* \*